J. HORTON & T. W. KEEN.
APPARATUS FOR LUBRICATING ENGINES.
APPLICATION FILED NOV. 11, 1908.
1,031,715.
Patented July 9, 1912.
2 SHEETS—SHEET 1.
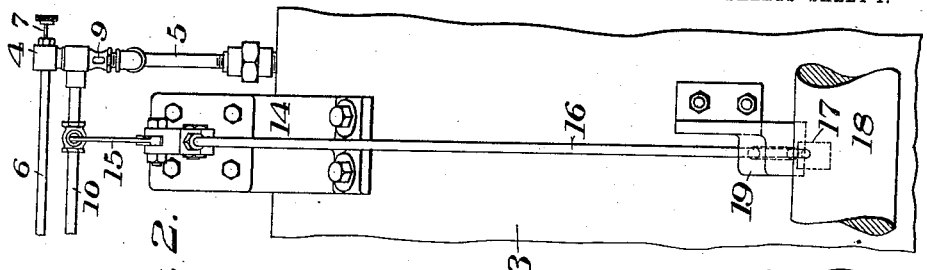
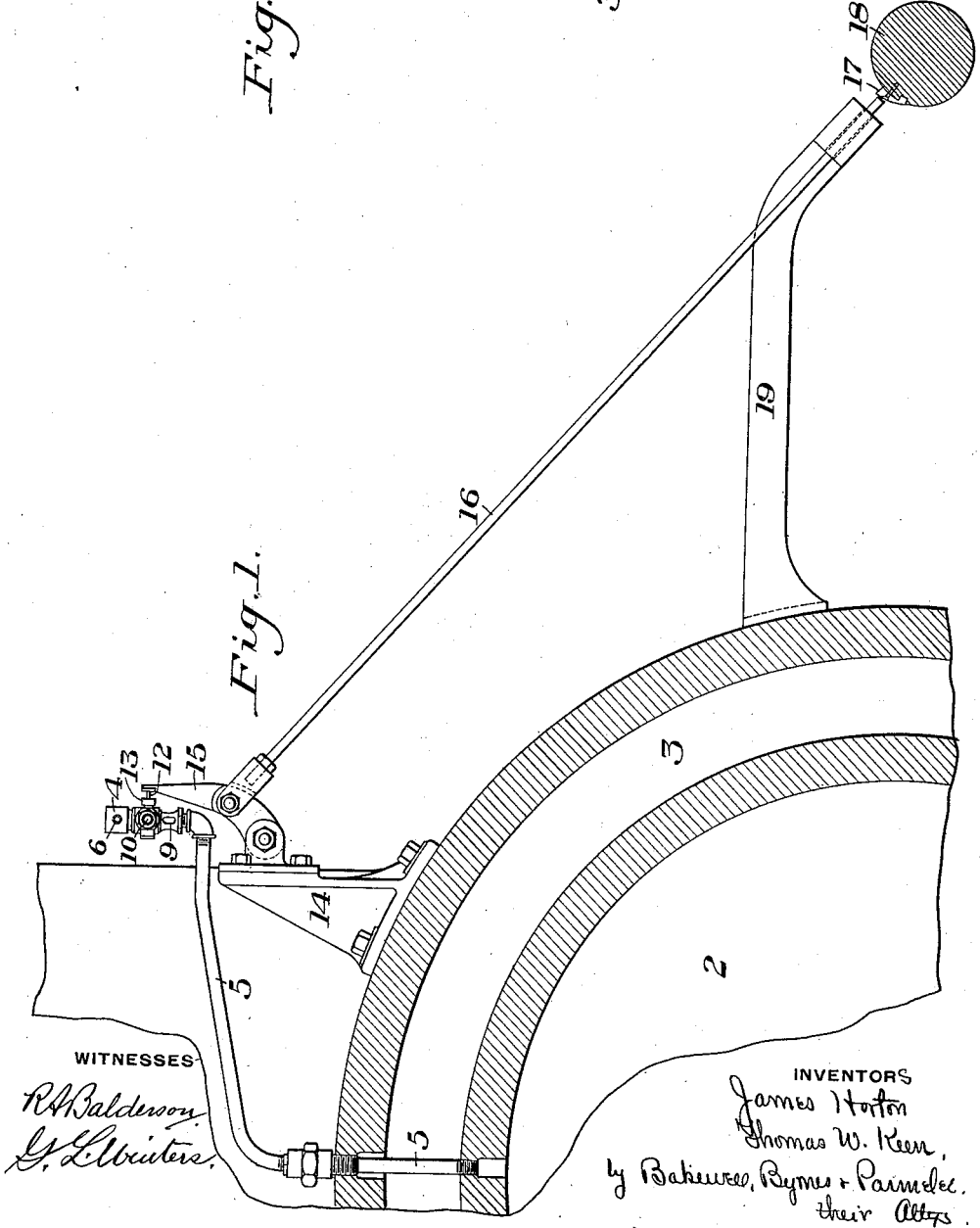

J. HORTON & T. W. KEEN.
APPARATUS FOR LUBRICATING ENGINES.
APPLICATION FILED NOV. 11, 1908.
1,031,715.
Patented July 9, 1912.
2 SHEETS—SHEET 2.
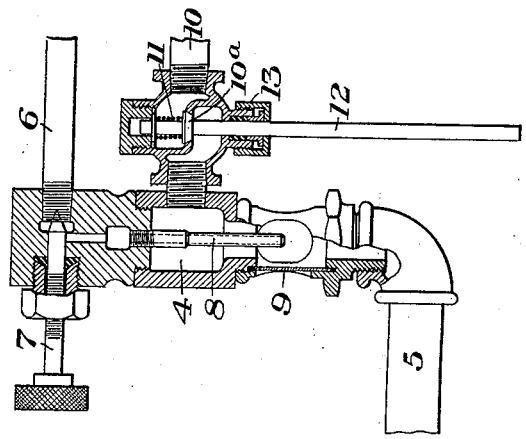
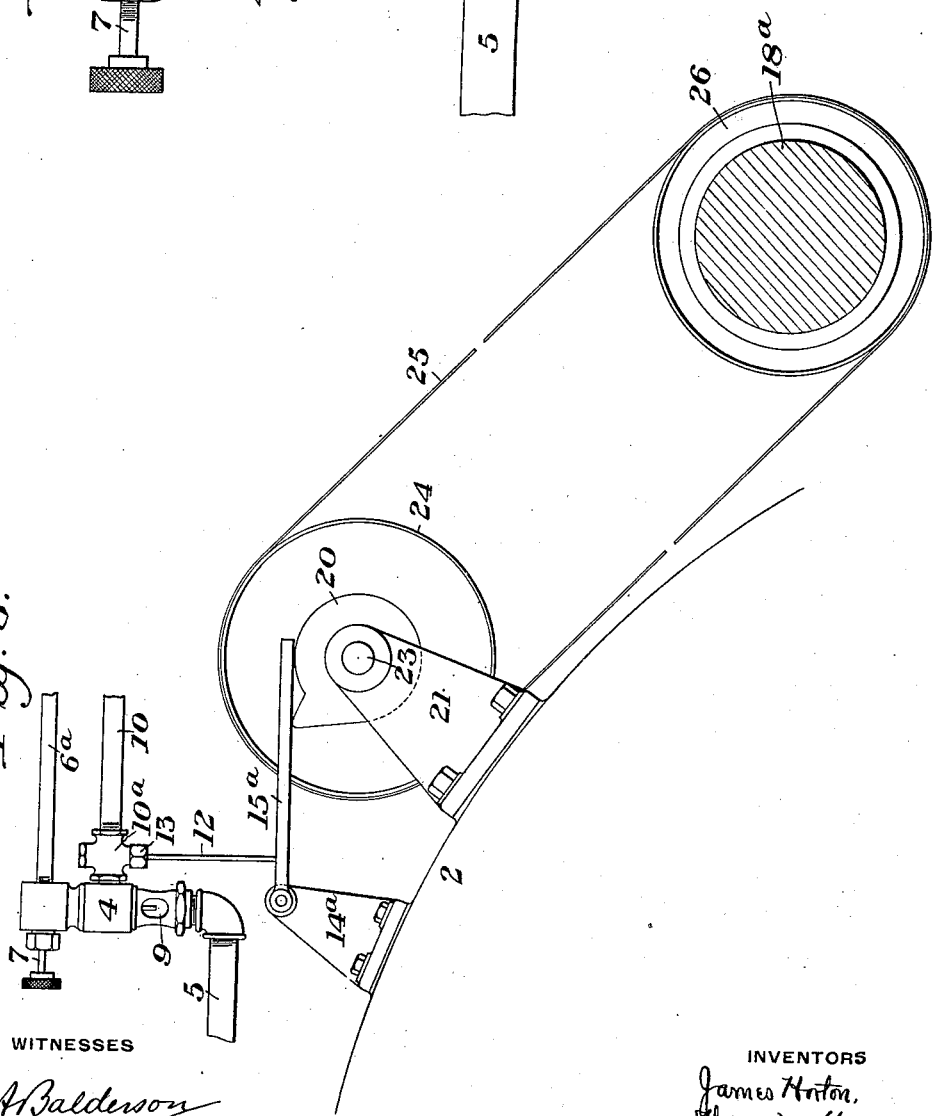

UNITED STATES PATENT OFFICE.

JAMES HORTON AND THOMAS W. KEEN, OF MUNHALL, PENNSYLVANIA.

APPARATUS FOR LUBRICATING ENGINES.

1,031,715.  Specification of Letters Patent.  Patented July 9, 1912.

Application filed November 11, 1908.  Serial No. 462,047.

*To all whom it may concern:*

Be it known that we, JAMES HORTON and THOMAS W. KEEN, both of Munhall, Allegheny county, Pennsylvania, have invented a new and useful Apparatus for Lubricating Engines, of which the following is a full, clear, and exact description, reference being had to the accompanying drawings, forming part of this specification, in which—

Figure 1 is an end elevation showing a gas engine cylinder equipped with our improved apparatus; Fig. 2 is a side elevation of the same; Fig. 3 is a view similar to that shown in Fig. 1 showing a modification of the actuating mechanism for the lubricator forming part of our invention; Fig. 4 is a detail, partly in section, of a portion of the apparatus, showing the sight-feed lubricator of Fig. 3 and its connections.

Our invention relates to the apparatus used in the lubrication of engines, particularly the larger types of engines and more particularly relates to lubricating apparatus used in connection with gas engines, in which blast furnace gases are used in driving the engines.

The lubricating apparatus used with such gas engines heretofore has been very unsatisfactory, as the lubricant is not effectively distributed over the large surface of the cylinder and in consequence the cylinders become badly scored and cut in a very short time after the engine is put into use.

The object of the invention is to provide improved apparatus for supplying lubricant to the cylinders of such gas engines and apparatus having means whereby the lubricant is positively fed into the cylinder and is sprayed on the interior of said cylinders.

Another object of our invention is to provide means for injecting the lubricant into the engine cylinder intermittently at predetermined times and mechanism by which the injecting means is automatically operated when the engine is operated.

In the drawings, 2 represents the cylinder of a gas engine having the usual water jacket 3, and 4 is the sight-feed lubricator which is connected by means of suitable piping 5 with the interior of the cylinder 2. The number of pipe connections 5 from the lubricator to the cylinder may be varied as is desired, or any number of separate lubricators 4 may be employed, each being connected to the cylinder 2 by means of a pipe 5. The lubricator 4 is secured to one end of the pipe 5 in any desired manner, and a supply pipe 6 for the lubricant is connected with the lubricator 4, the flow of the lubricant into the lubricator being regulated by means of the needle valve 7. The lubricant is preferably fed into the pipe 6 under pressure, although the supply of lubricant may be located at a point above the level of the pipe 6 so as to feed into the lubricator by gravity. The oil or other lubricant drips through the feeder 8, as shown in Fig. 3, the dropping of the lubricant being observable through the glass 9 and the supply of lubricant in this way can be increased or lessened as desired by regulating the flow by means of the needle valve 7, the lubricant dropping from the pipe 8 and collecting in small quantities in the pipe 5 leading to the cylinder 2. Connected into the lubricator 4 at a suitable point below the oil inlet pipe 6 is a pipe 10 connected with a source of compressed air, this pipe having a valve $10^a$ which is normally held closed by means of the spring 11 in the valve; the valve stem 12 projecting through a suitable stuffing box 13 as is shown in the drawings.

Mounted on a suitable support 14 on the cylinder 2 is a rocking lever arm 15, the rocking end of this arm contacting with the end of the valve stem 12. As shown in Fig. 1 the rocking arm 15 is connected by means of an adjustable reach rod or lever 16 with a cam 17 which is secured to and forms part of the lay shaft 18 of the engine. The end of the rod 16 is supported by a suitable bracket 19 secured to the engine cylinder 3 for that purpose.

In the modification shown in Fig. 3, the arm $15^a$ is pivotally secured to the bracket $14^a$ which is secured on the cylinder 2. A cam wheel 20 is mounted in the bracket 21 which is secured on the cylinder 2, this cam wheel being mounted on the shaft 23 and actuating the lever arm $15^a$ when the shaft 23 is rotated. The shaft 23 is provided with a wheel 24 which may be either a belt wheel driven by a belt 25 as is shown or may be a sprocket wheel, in which case it will be driven by a suitable sprocket chain and the belt 25 is connected to a suitable belt wheel or pulley 26 which is mounted on and rotated by the lay shaft $18^a$. The valve $10^a$ is connected with a source of fluid pressure supply, such as compressed air, by means of the pipe $6^a$.

In the operation of our improved apparatus, as shown in Figs. 1 and 2, the lubricant is fed into the pipe 5 through the lubricator 4 either by gravity or by means of compressed air or other fluid pressure. The lubricant dropping from the end of the pipe 8 through the lubricator 4 into the pipe 5, collects in this pipe between the strokes of the gas engine. As the gas engine is actuated, the lay shaft 18 revolves and by each revolution of the lay shaft 18 the cam 17 will reciprocate the rod 16 which in turn moves the pivoted lever arm 15. The rocking end of the lever arm 15 contacts with the stem 12 of the valve 10ᵃ and at each revolution of the lay shaft moves the stem 12 to open the valve 10ᵃ. The opening of the valve 10ᵃ admits momentarily a supply of compressed air through the pipe 10 into the lubricator 4 and the air forces the lubricant which has collected in the pipe 5 into the cylinder 2 in the form of spray and causes it to reach all parts of the inner surface of the cylinder.

The supply of lubricant can be regulated by means of the needle valve 7 so that the right amount is injected into the cylinder at each revolution of the lay shaft 18, and as in each revolution of the lay shaft a predetermined amount of oil is positively forced into the cylinder the proper lubrication of the engine cylinder is assured.

Modifications in the construction and arrangement of the parts may be made without departing from our invention.

The valve and the manner of actuating the valve on the lubricator may be changed; the construction and arrangement of the lubricator may be varied and other changes may be made.

We claim:—

1. In a lubricator, the combination with a spray pipe, of a drop feed lubricator in communication with the pipe and including a casing and a dropping tube extending therethrough, a conduit leading from a source of fluid pressure into the casing in rear of the discharge end of the dropping tube, a valve in the conduit, and means for intermittently opening the valve.

2. The combination with an engine cylinder of a spray pipe communicating with the expansion chamber of the cylinder independent of the charge inlet, a drop feed lubricator in communication with the spray pipe, a conduit leading through the lubricator from a source of fluid pressure for supplying the spray pipe with pressure, a valve in the conduit, and means for intermittently opening the valve.

3. The combination with a gravity feed lubricator and its delivery connection, of a fluid pressure supply connected with the discharge of the lubricator, a valve controlling the pressure supply, and means for operating the valve at regular intervals.

4. The combination with a lubricator having inlet and discharge outlets, of an independent fluid pressure supply delivered into the discharge connection of the lubricator, a valve for controlling the fluid pressure supply, and means for intermittently operating the valve to thereby permit the flow of fluid pressure to discharge the lubricant.

5. Apparatus for lubricating engine cylinders comprising means connecting a dropping tube with a source of liquid lubricant, a conduit into which said dropping tube discharges regulated quantities of the lubricant, said conduit leading into said engine cylinder, a fluid pressure supply connected with the conduit between the dropping tube and engine cylinder, a valve controlling the fluid pressure supply, and means for intermittently operating said valve to admit fluid pressure to the conduit and thereby force lubricant therein into the engine cylinder.

In testimony whereof, we have hereunto set our hands.

JAMES HORTON.
THOMAS W. KEEN.

Witnesses:
J. A. HAMILTON,
W. H. CORBETT.

Copies of this patent may be obtained for five cents each, by addressing the "Commissioner of Patents, Washington, D. C."